United States Patent Office 3,393,977
Patented July 23, 1968

3,393,977
PROCESS FOR PREPARING COMPOUNDS CONTAINING SULFUR AND FLUORINE
Horst G. Langer, Cochituate, Mass., assignor to The Dow Chemical Company, Midland, Mich., a corporation of Delaware
No Drawing. Filed June 5, 1964, Ser. No. 373,103
5 Claims. (Cl. 23—203)

ABSTRACT OF THE DISCLOSURE

The present invention consists of a novel process for preparing sulfur-fluorine-containing compounds, which are useful as intermediates in chemical synthesis, which comprises providing a mixture of an inorganic metal fluroine-containing salt, such as calcium fluoride ($CaF_2$), an inorganic sulfur-containing compound, and a scavenging agent, such as titanium dioxide ($TiO_2$); reacting said mixture under controlled conditions; and recovering said sulfur-fluorine-containing products from the reaction mass.

---

A principal object of the present invention is to provide a novel process for preparing sulfur-fluorine-containing compounds which ordinarily are difficult to obtain. A further object is to provide a process wherein useful, but many times hard to prepare, sulfur-fluorine-containing compounds are prepared using calcium fluoride as a raw material.

Other objects and advantages will become apparent from the detailed description of the invention which follows:

Accordingly, the novel process of the present invention for preparing sulfur-fluorine-containing compounds comprises in general the steps of, providing a reaction mixture of an inorganic metal fluorine-containing salt, such as, for example, calcium fluoride ($CaF_2$), an inorganic sulfur-containing compound or salt, and a scavenging agent such as titanium dioxide, said agent being reactive with the metal component of said fluorine salt, reacting said mixture in an inert atmosphere, such as in argon or nitrogen, at a reaction temperature sufficient to melt the reactants and cause an exchange reaction but below the boiling point of the reaction mass, thereby to form a gaseous mixed product in substantially quantitative yields comprising various useful sulfur-fluorine-containing compounds, which may then be collected and recovered by means commonly employed by those skilled in the art. These latter operations may be carried out by condensing the gaseous product in, for example, a liquid nitrogen cooled trap, or other low temperature receiver.

The various sulfur-fluorine-containing compounds which may be so-recovered comprise, for example, sulfurylfluoride ($SO_2F_2$), thiocarbonyl fluoride ($CSF_2$), sulfur tetrafluoride ($SF_4$), sulfur hexafluoride ($SF_6$), sulfur decafluoride ($S_2F_{10}$), thionyl fluoride ($SOF_2$), trifluoromethyl thiofluoride ($CF_3SF$), bistrifluoromethylsulfide ($CF_3SCF_3$), trifluoromethylsulfurylfluoride ($CF_3SO_2F$), trifluoromethylthionylfluoride ($CF_3SOF$), and bistrifluorosilylsulfide ($SiF_3)_2S$.

The aforenamed compounds are highly useful as intermediates in chemical synthesis work. More specifically, the compounds thiocarbonylfluoride, sulfur tetrafluoride, sulfur hexafluoride, and sulfur decafluoride, for example, are useful in vulcanizing rubber. Methylfluorosulfide is useful as a foaming agent. Sulfurylfluoride is useful as a fumigant. Bistrifluorosilyl sulfide, for example, is useful in the production of polymers.

In the present process, the reaction ordinarily is carried out at a temperature of from about 1500° C. to about 3000° C. Optimally, a temperature of from about 2500° C. to about 3000° C. is employed, for example, when reacting calcium fluoride, titanium dioxide and calcium sulfate, the preferred reactants. Such a reaction temperature may be obtained by use of an electric arc furnace even though application of an electric potential through the mix is unnecessary in carrying out the present invention. Other sources of heat, of course, may also be employed. Reaction in the electric arc furnace, however, is most convenient and is preferred.

In actual operation using such a furnace, the reaction mixture is placed in a carbon crucible as an anode, and an arc established therewith by contacting the crucible and contents with a carbon cathode rod, thereby to melt the mixture. Normally, a low potential such as for example, 5–10 volts at 50–100 amperes, is first applied from about 15 to 30 minutes to accomplish said melting, whereupon, the rod is drawn slightly so as to provide a gap between the melt and rod and then the maximum operating potential applied, such as, for example, a potential of about 25 volts at 150 to 200 amperes.

The gaseous sulfur-fluorine-containing compounds prepared by the present novel process can, as aforesaid, be recovered by condensation. For example, a trap series may be employed comprising, an air cooled column and container as a first trap, wherein dust and unreacted materials blown over from the reactor are caught, a second trap comprising a water cooled column to precool said gaseous product, a Dry Ice-acetone cooled column and reservoir as a third step wherein the high boiling product compounds are condensed and recovered, and a fourth trap or condenser where the lower boiling product compounds condense and are recovered. The condensed product compounds so-recovered may either be placed in suitable pressure vessels at normal temperatures or in vessels at atmospheric pressure with cooling.

The inorganic fluorine-containing salt, sulfur-containing salt and scavenging agent are ordinarily reacted in molar proportions such to provide at least an oxygen-to-fluorine ratio of about 1 to 1 and a sulfur-to-fluorine ratio of at least 1 to 1. Preferably, however, an excess of oxygen ordinarily furnished by the scavenger, and of one of the aforesaid sulfur salts is present. For instance, when reacting $CaF_2$ with $CaSO_4$ and $TiO_2$ in accordance with the present invention a molar ratio of 1 to 5 to 7 may be employed.

The inorganic fluorine-containing salts suitable for use in the present invention include both simple and complex fluorides, the metal component of said simple fluorides being a member of Group I-A and II-A of the Mendeleeff arrangement of the elements. Examples of suitable fluoride salts are calcium fluoride ($CaF_2$), cryolite ($Na_3AlF_6$), fluoroapatite ($Ca_{10}(PO_4)_6F_2$), sodium fluorosilicate ($Na_2SiF_6$), sodium fluoride (NaF), potassium fluoride (KF), and sodium fluoroaluminate ($Na_3AlF_6$), and the like.

The inorganic scavenging agents suitable for use in the present invention are oxygen-containing materials which are reactive with the metal component of the inorganic fluorine salts aforesaid.

Examples of typical scavenging agents are oxides such as, for example, titanium dioxide ($TiO_2$), zirconium oxide ($ZrO_2$), hafnium oxide ($HfO_2$), silicon dioxide ($SiO_2$), lead oxide ($PbO_2$), borates such as potassium metaborate ($K_2B_2O_4$), potassium tetraborate ($K_2B_4O_7$), boron oxide ($B_2O_3$), sodium tetraborate ($Na_2B_4O_7$), aluminum oxides such as $Al_2O_3$, beryllium aluminate ($BeAl_2O_4$), iron aluminate ($FeAl_2O_4$), and iron oxides, such as iron phosphate ($Fe_3P_2O_8$), iron metatitanate ($FeTiO_3$), Ilmenite ($FeO \cdot TiO_2$), and the like.

With respect to the inorganic sulfur compounds which may be used in the present invention, the common sulfates, sulfites, sulfides, thiosulfates, pyrosulfates, oxides of sulfur, and the like may be employed.

In carrying out the process of the present invention in its preferred form to obtain the useful sulfur-fluorine product compounds aforesaid, fluorospar ore is pulverized to a particle size such that about 95 percent thereof will pass a number 80 to a number 100 mesh screen (U.S. Standard Sieve Series). This is admixed with titanium dioxide and a sulfur-containing inorganic compound such as $CaSO_4$, or elemental sulfur, in a molar ratio of 1 to 5 to 7, respectively, whereupon, the mixture is introduced into a carbon crucible equipped with a hood means connected to a series of cold traps, as hereinbefore described, for collecting and recovering the evolved gases. A carbon electrode is then immersed so as to be in contact with the crucible and mixture therein. Thereafter, said mixture is heated to the melting and reaction temperature specified hereinbefore in an argon atmosphere. By so-doing the reaction mass melts and evolves a mixed gas consisting of various compounds containing sulfur and fluorine. The gas so-evolved is then collected and recovered by means of the aforesaid trap series.

The following example serves to further illustrate the present invention, said invention not intended to be limited thereto.

EXAMPLE I

About 39 grams of calcium fluoride together with about 14 grams of calcium sulfate and 60 grams of titanium dioxide (these amounts representing substantially stoichiometric proportions) were placed in a graphite carbon crucible, said crucible also serving as the anode of an electric arc furnace. An electric arc was then established with the crucible and contents by means of a carbon rod as a cathode to melt and heat decompose said contents at a reaction temperature of approximately 1500° C. to 2000° C. The melting was first started with an arc of low potential then after about 15 to 30 minutes increasing the potential to a maximum of 25 volts at about 150 to 200 amperes over a reaction time of about 3 hours. During the reaction argon was passed through the furnace to surround the arc and melt and also to serve as a carrying gas for the gaseous reaction product being evolved.

The so-formed gaseous reaction product, which comprised a mixture of gaseous compounds, each containing sulfur and fluorine, was then passed by means of the argon carrier through a series of cooled traps or condensers used for recovery purposes. This series consisted essentially a first trap comprising a columned air chamber, a water cooled column and container as a second trap, a third trap consisting of a Dry Ice-acetone cooled column and reservoir, and a final trap consisting of a column and flask cooled by liquid nitrogen.

In traversing said trap series, dust comprising a very small portion of the reactants, blown over from the crucible, was caught in the first trap, within the water cooled trap being used mainly to preliminarily cool the mixed gaseous reaction product, while relatively high boiling sulfur-fluorine-containing compounds such as, for example, sulfur decafluoride ($S_2F_{10}$) were recovered in the Dry Ice-acetone condenser, and the lower boiling compounds as liquids such as, for example ($SO_2F_2$) sulfuryl fluoride were in the nitrogen trap.

The product so-recovered, including the residue left in the crucible were analyzed by use of a Bendix Timeflight Mass Spectrometer. Thiocarbonyl fluoride ($CSF_2$), sulfur tetra- and hexa- and decafluorides ($SF_4$), ($SF_6$), ($S_2F_{10}$), sulfuryl fluoride ($SO_2F_2$) trifluoromethyl thiofluoride ($CF_3SF$), thionylfluoride ($SOF_2$), and other sulfur-fluorine-containing compounds were recovered in combination and so-identified.

The mixed product so-condensed and recovered may then be singly recovered by means of further processing such as, for example, by conventional fractional distillation and absorption or by other means to obtain therefrom the individual useful compounds aforesaid.

The above described process was carried on to the point where about 70 to 80 percent of the original amount of available fluorine was converted to the compounds hereinbefore described. It is understood, of course, that essentially a 100 percent conversion could readily be obtained by extending the reaction period so as to completely consume the reactants and convert all the fluorine and sulfur values in the melt to the sulfur-fluorine-containing product.

Similarly as in the foregoing example, combination of the other combinations of reactants specified hereinbefore may also be reacted to produce the sulfur-fluorine-containing compounds described.

The present invention may be changed or modified without departing from the spirit or scope thereof, and it is understood that I limit myself only as defined in the appended claims.

I claim:

1. A method of preparing sulfur-fluorine-containing compounds selected from the group consisting of sulfuryl fluoride, sulfur tetrafluoride, sulfur hexafluoride, sulfur decafluoride, thionyl fluoride, bistrifluorosilylsulfide, which comprises: providing a reaction mixture of an inorganic metal fluorine-containing salt selected from the group consisting of calcium fluoride, fluoroapatite, sodium fluorosilicate, sodium fluoride, potassium fluoride and sodium fluoroaluminate; an inorganic sulfur compound selected from the group consisting of sulfates, sulfites, thiosulfates, pyrosulfates and oxides of sulfur; and an inorganic oxygen-containing scavenging agent selected from the group consisting of titanium dioxide, zirconium oxide, hafnium oxide, silicon dioxide, lead oxide, potassium metaborate, potassium tetraborate, boron oxide, sodium tetraborate, beryllium aluminate, iron aluminate, iron phosphate, iron metatitanate and ilminite, which is reactive with the metal component of the fluorine-containing salt, the reactants being present such to provide a mole ratio of oxygen-to-fluorine of at least 1 to 1 and a sulfur-to-fluorine mole ratio of at least 1 to 1; reacting said mixture in an inert gaseous atmosphere and at a temperature of from about 1500° C. to about 3000° C., thereby to form a gaseous product having said sulfur-fluorine-containing compounds therein; and recovering the gaseous products so-formed.

2. The method of claim 1 wherein the inorganic metal fluorine-containing salt, the inorganic sulfur compound, and the scavenging agent are reacted in substantially stoichiometric mole proportions.

3. The method of claim 1 wherein the sulfur-fluorine-containing compounds are recovered by condensation.

4. The method of claim 1 wherein the reaction is carried out in an electric arc furnace having a carbon crucible anode and a carbon cathode rod, thereby preparing additional sulfur-fluorine-containing compounds selected from the group consisting of thiocarbonyl fluoride, trifluoromethyl thiofluoride, bistrifluoromethylsulfide, trifluoromethylsulfurylfluoride, trifluoromethylthionylfluoride.

5. A method of preparing sulfur-fluorine-containing compounds selected from the group consisting of sulfuryl fluoride, sulfur tetrafluoride, sulfur hexafluoride, sulfur decafluoride, thionyl fluoride, bistri-fluorousilylsulfide, which comprises: providing a reaction mixture of calcium fluoride, titanium dioxide and a sulfur-containing compound selected from the group consisting of sulfates, sulfites, sulfides, thiosulfates, pyrosulfates and oxides of sulfur, said reactants being present in the reaction mixture such to provide an oxygen-to-fluorine mole ratio of at least 1 to 1 and a sulfur-to-fluorine mole ratio of at least 1 to 1; reacting said mixture in an inert atmosphere, and at a reaction temperature of from about 1500° C. to about 3000° C., thereby to evolve a mixed gaseous reaction product of sulfur-fluorine-containing compounds; condensing said mixed product to form a condensate; and recovering the sulfur-fluorine compounds individually from said condensate so-formed by fractional distillation.

References Cited

UNITED STATES PATENTS

| | | | |
|---|---|---|---|
| 1,865,204 | 6/1932 | Otto et al. | 23—205 |
| 3,132,925 | 5/1964 | Pacini et al. | 23—203 |

OSCAR R. VERTIZ, *Primary Examiner.*

HOKE S. MILLER, *Assistant Examiner.*